(12) United States Patent
Song et al.

(10) Patent No.: US 9,924,643 B2
(45) Date of Patent: Mar. 27, 2018

(54) INTELLIGENT TREE TRANSPLANTER

(71) Applicant: Beijing Maikehage International Ecological Environmental Engineering Technology Co., Ltd., Beijing (CN)

(72) Inventors: Chengze Song, Beijing (CN); Wanyin Zhu, Beijing (CN); Fachen Guan, Beijing (CN); Qianjing Su, Beijing (CN); Chengwen Song, Beijing (CN); Xiangda Song, Beijing (CN); Xiujuan Bai, Beijing (CN); Lingjing Zhang, Beijing (CN); Chengquan Song, Beijing (CN)

(73) Assignee: Beijing Maikehage International Ecological Environmental Engineering Technology Co., Ltd. (CN)

( * ) Notice: Subject to any disclaimer, the term of this patent is extended or adjusted under 35 U.S.C. 154(b) by 0 days.

(21) Appl. No.: 15/183,416

(22) Filed: Jun. 15, 2016

(65) Prior Publication Data

US 2017/0181388 A1    Jun. 29, 2017

(30) Foreign Application Priority Data

Dec. 28, 2015 (CN) .......................... 2015 1 1000163

(51) Int. Cl.
*A01G 23/04* (2006.01)

(52) U.S. Cl.
CPC .................... *A01G 23/043* (2013.01)

(58) Field of Classification Search
CPC ...... A01G 23/043; A01G 23/04; A01G 23/02; A01G 23/00
See application file for complete search history.

(56) References Cited

U.S. PATENT DOCUMENTS

2004/0050309 A1* 3/2004 Reilly .................. A01G 23/043
111/101

* cited by examiner

*Primary Examiner* — Christopher J. Novosad

(57) ABSTRACT

The present invention relates to an intelligent tree transplanter that comprises a rotary support, a structure comprising at least one horizontal hydraulic closed telescopic boom that is driven by and connected to a driving device, wherein there is a multi-way valve assembly, tree-oriented anchor point and infrared horizontal automatic calibration point, wherein there is a ball pool data detector including infrared central contact in the center of the present device; and, a lateral hydraulic telescopic boom that drives the rotary support comprising a number of regolith scrapers, and at least one vertical hydraulic angle rotating shaft connected to a vertical hydraulic telescopic joints are located at the bottom of the device. Vertical hydraulic telescopic joints that are connected to the ball-end horizontal rotating shaft are also located at the bottom of the device.

8 Claims, 5 Drawing Sheets

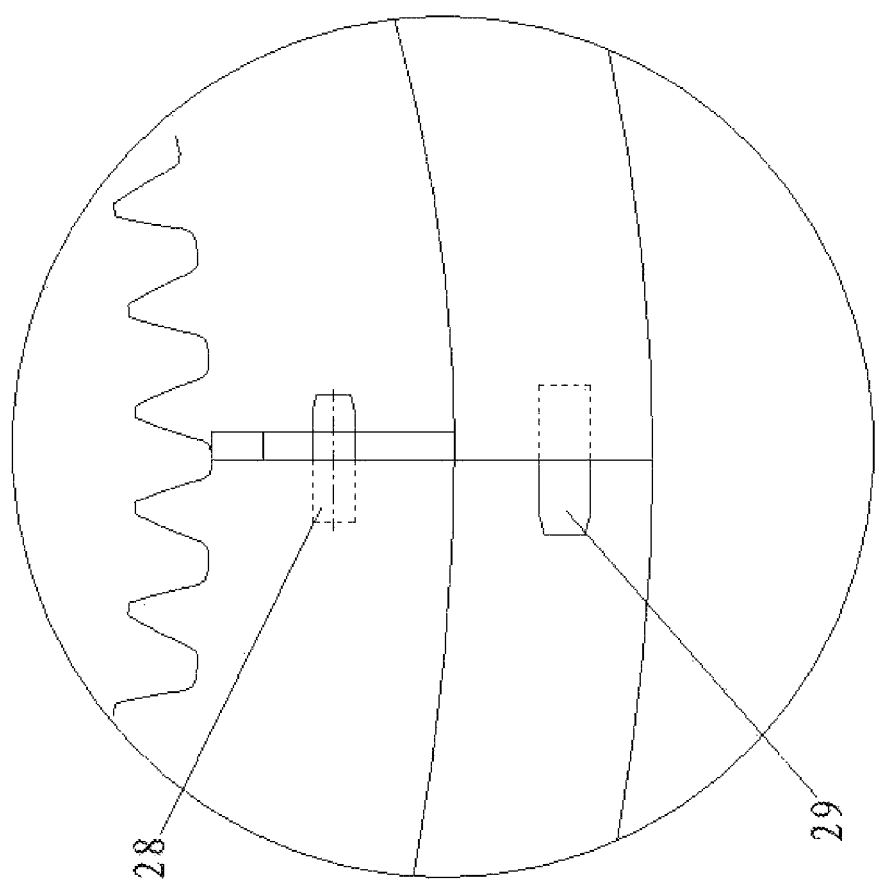

INTELLIGENT TREE TRANSPLANTER

FIELD OF INVENTION

The invention relates to an intelligent tree transplanting machine.

BACKGROUND

Currently, the process of moving and planting trees is cumbersome and inefficient. Tree movers from Germany, Japan, the Netherlands, and China currently use pressed cutters, cambered cutters, and chain cutters that are subject to soil compaction and pressure, which may result in a damage to the ball diameter. Further, most field soils are not applicable; and, cambered cutters reach to the bottom for moving pot bottom-shaped balls, only to severely damage plant roots. Similarly, chain cutters apply force to lateral roots due to upward hook force, which may damage soil balls.

None of the traditional art allows for one-step forming. Further, the traditional art requires dense soils, which is impractical in many environments. In other environments not suitable for the traditional art, one is required to manually dig balls, which is expensive, inefficient, reduces the survival rate of the trees, and results in less favorable long-term development in transplanting limited by soils.

Furthermore, none of these references effectively minimizes stress during use.

SUMMARY OF THE INVENTION

The present invention offers a kind of intelligent tree transplanting equipment, which can solve the problems mentioned above.

Accordingly, it is a principle object of the present invention to aid in the effective and efficient process of removing and transplanting trees. One embodiment of the instant intelligent tree transplantor comprises rotary support;

a structure comprising at least one horizontal hydraulic closed telescopic boom driven by and connected to a driving device; a multi-way valve assembly, tree-oriented anchor point and infrared horizontal automatic calibration point; a ball pool data detector comprising at least one infrared central contact located in the center of the device; a lateral hydraulic telescopic boom that drives the rotary support located at the bottom of the device, comprising a number of regolith scrapers and at least one vertical hydraulic angle rotating shaft connected to vertical hydraulic telescopic joints located at the bottom of the device;

vertical hydraulic telescopic joints connected to the ball-end horizontal rotating shaft located at the bottom of the device; a ball-end horizontal rotating shaft connected to the hydraulic foldable telescopic cutter located horizontally at the bottom to the center of the device; a hydraulic foldable telescopic cutter connected to the solid spray device at the other end of the device; and, vertical hydraulic telescopic joints comprising a ramming bent plate, a hydraulic tamping device, and a ball-end horizontal rotating shaft comprising a cutter assembly, wherein said rotary support is connected to plant growth technology index chips on the inner ring by the hydraulic support rod.

In another embodiment of the present intelligent tree transplanter device, the driving device comprises an operating rack connected to the horizontal hydraulic closed telescopic boom by the drive. The operating rack is connected to the telescopic boom by the loaded rotation shaft. The telescopic boom is connected to the operating rack by the adjustable boom and connected to and driven by the power unit for walking of the transplanter; and, the adjustable boom comprises hydraulic support arms.

In another embodiment of the present intelligent tree transplanter device, the rotary support comprises two semi-circular rings that are able to piece a whole circular ring with intelligent automatic joints for the rotary support.

In another embodiment of the present intelligent tree transplanter device, the intelligent automatic joints for the rotary support comprises a matching automatic closing piece and a closed lock sheath. Further, the closed lock sheath is located at the end of the rotary support joints and the automatic closing piece is located on the upper side of the rotary support.

In another embodiment of the present device, the ball-end horizontal rotating shaft that drives the cutter assembly by the inward motor.

In another embodiment of the present device, the cutter assembly comprises interconnecting scrapers, inner cutters and outer cutters, and a soil feed opening that is connected to the solid spray device.

In another embodiment of the present device, the plant growth technology index chips are fixed to the rotary support and are able to be stretched to roots of the trees.

In another embodiment of the present device, the three horizontal hydraulic telescopic joints are evenly located on the outer ring of the rotary support Beneficial effects of the invention: It integrates tree pool digging, tree moving, soil protection and tree planting, makes an accurate use of balls, ball diameters, ball shapes and dimensions, and by fixing the surface hardening for balls, avoids the tedious process for repackage and solves key problems such as low efficiency, poor quality, low survival rate.

BRIEF DESCRIPTION OF THE DRAWINGS

To better illustrate the implementations of the Invention or the technical solutions in the existing technology, a brief introduction of the figures necessary for the implementations is as follows. Obviously, the following described figures are merely for some of the implementations of the Invention, and to the general technical personnel in this field, they may obtain other figures on the basis of the following ones without any creative work.

FIG. 5 is the enlarged diagram of the rotary support joints as described in the invention embodiment.

Figure 1:
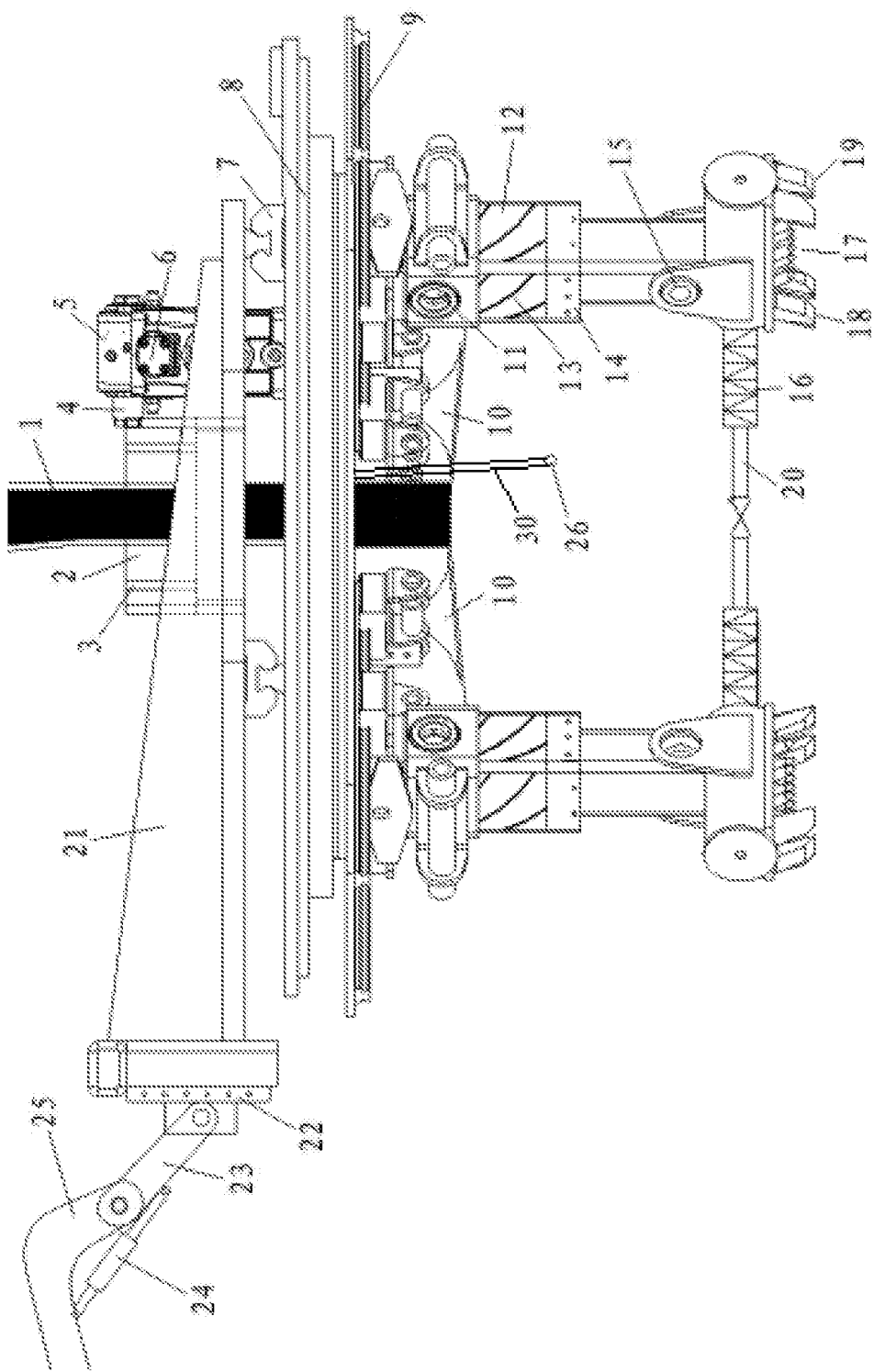
FIG. 1 is a structure diagram of the intelligent tree transplanter as described in the Invention embodiment.

In the figures:
1. Tree trunk 2. Pool data detector 3. Infrared central contact
4. Tree oriented anchor point 5. Multi-way valve assembly
6. Infrared horizontal automatic calibration point
7. Horizontal hydraulic closed telescopic boom 8. Rotary support
9. Lateral hydraulic telescopic boom 10. Regolith scraper
11. Vertical hydraulic angle rotating shaft 12. Vertical hydraulic telescopic joint 13. Ramming bent plate
14. Hydraulic tamping device 15. Ball-end horizontal rotating shaft
16. Hydraulic foldable telescopic cutter 17. Scraper 18. Inner cutter
19. Outer cutter 20. Solid spray device 21. Operating rack
22. Loaded rotation shaft 23. Adjustable boom 24. Hydraulic support arm 25. Telescopic boom
26. Plant growth technology index chip 27. Power unit for walking of the transplanter
28. Automatic locking piece 29. Closed sheath 30. Hydraulic support rod

DETAILED DESCRIPTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 2:
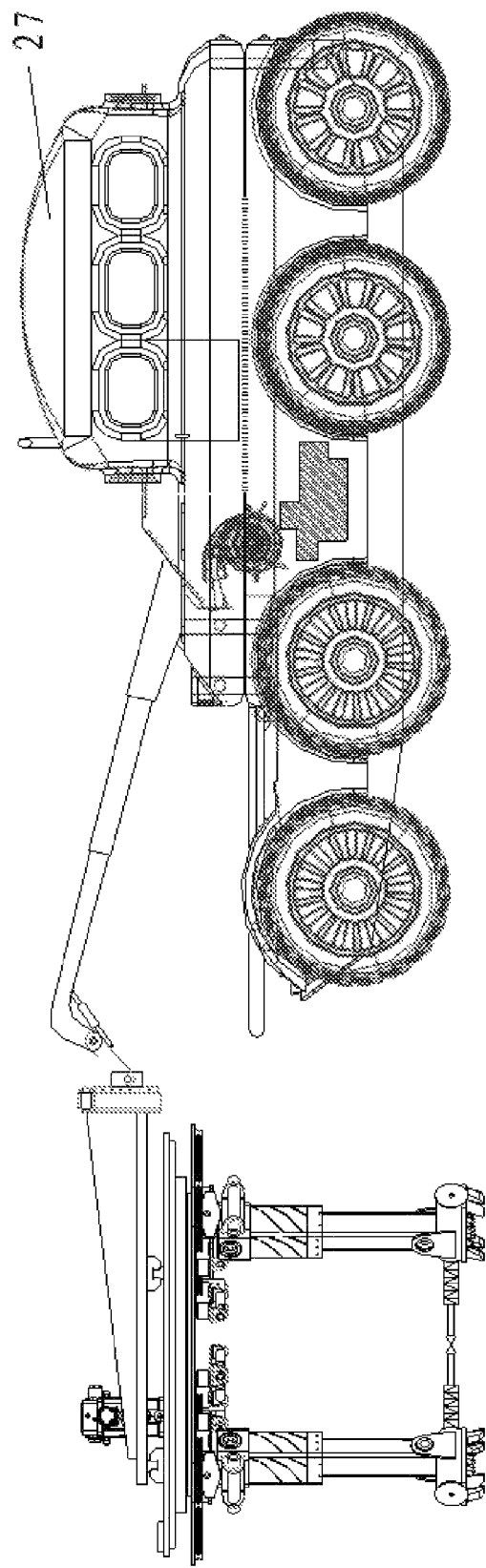
FIG. 2 is an overall structure diagram for employment of the intelligent tree transplanter as described in the invention embodiment.
Figure 3:
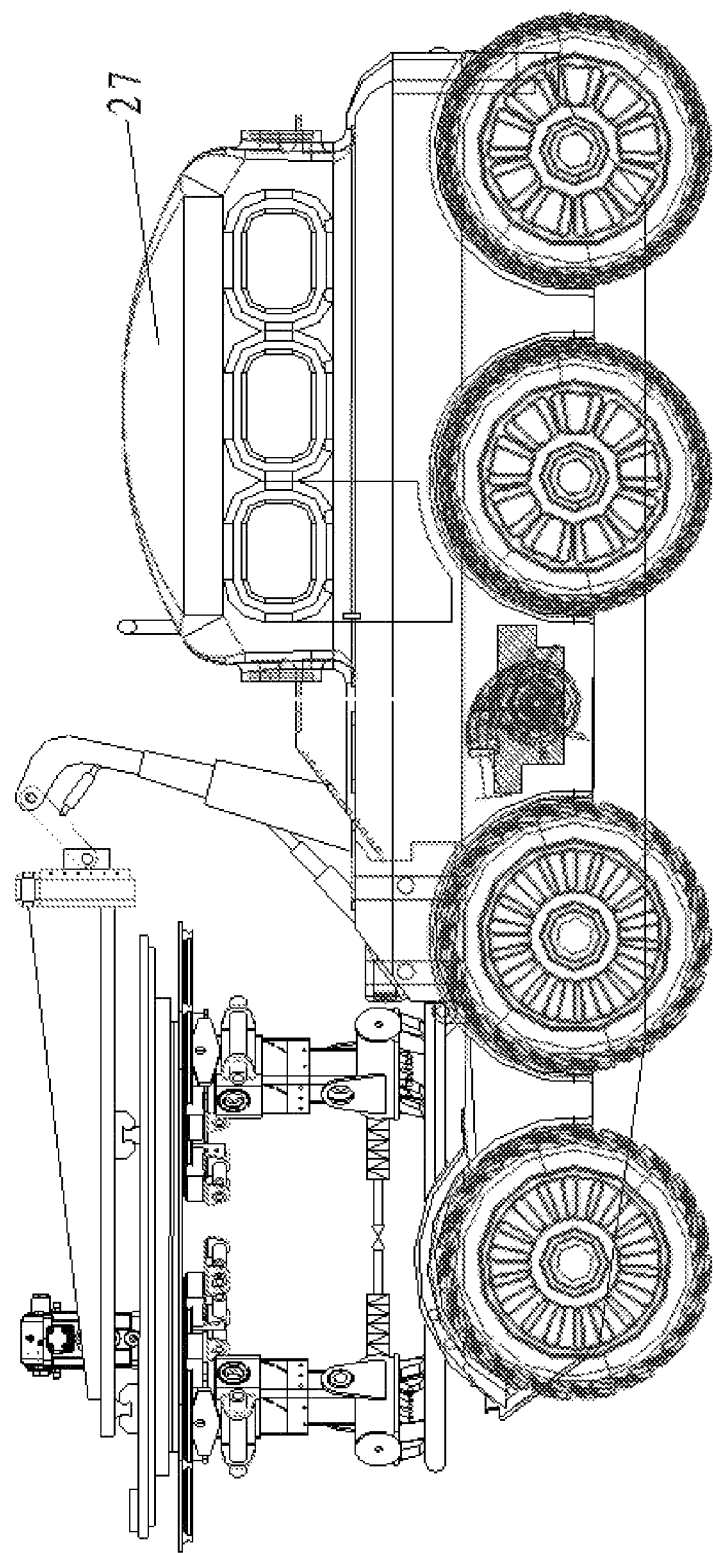
FIG. 3 is an overall structure diagram for contracting of the intelligent tree transplanter as described in the invention embodiment.
Figure 4:
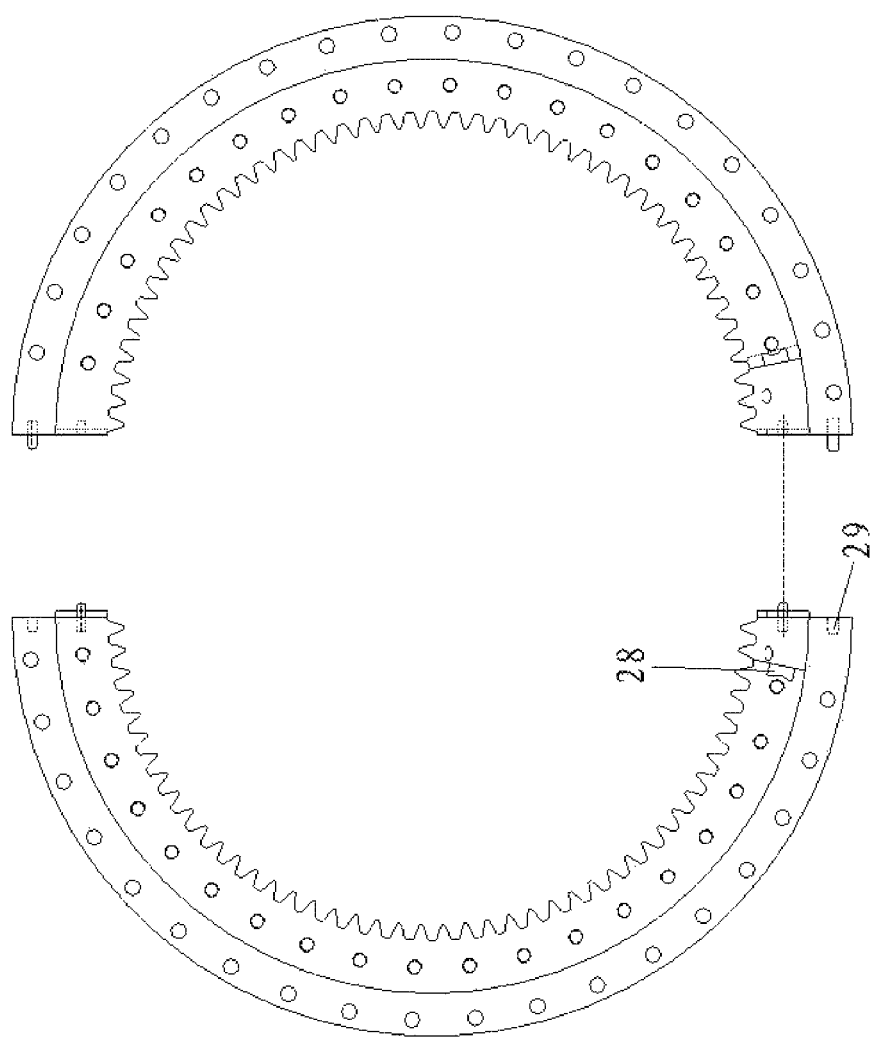
FIG. 4 is an exploded view of the rotary support as described in the invention embodiment.

As shown in FIGS. 1-5, the present device comprises the rotary support 8, wherein a structure comprising at least one horizontal hydraulic closed telescopic boom 7 driven by and connected to the driving device; a multi-way valve assembly 5, tree-oriented anchor point 4 and infrared horizontal automatic calibration point 6; a ball pool data detector 2 located in the center of the device comprising at least one infrared central contact 3; a lateral hydraulic telescopic boom 9 at the bottom of the present device that drives the rotary support, comprising a number of regolith scrapers 10 evenly, and at least one vertical hydraulic angle rotating shaft 11 connected to vertical hydraulic telescopic joints 12 at the bottom of the present device; vertical hydraulic telescopic joints 12 are connected to the ball-end horizontal rotating shaft 15 at the bottom of the present device, and the ball-end horizontal rotating shaft 15 is connected to the hydraulic foldable telescopic cutter 16 horizontally at the bottom to the center of the present device; hydraulic foldable telescopic cutter 16 is connected to the solid spray device 20 at the other end of the device; vertical hydraulic telescopic joints 12 comprise a ramming bent plate 13 and a hydraulic tamping device 14. The ball-end horizontal rotating shaft 15 comprises a cutter assembly, and, the rotary support connected to Plant growth technology index chips on the inner ring 26.

The driving device comprises an operating rack 21 connected to the horizontal hydraulic closed telescopic boom 7 by the drive. Operating rack 21 is connected to the telescopic boom 25 by the loaded rotation shaft 2. Telescopic boom 25 is connected to the operating rack 21 by the adjustable boom 23, and connected to and driven by the power unit for walking of the transplanter 27; adjustable boom 23 comprises hydraulic support arms 24.

The rotary support 8 comprises two semicircular rings that are able to piece a whole circular ring with intelligent automatic joints for the rotary support.

The intelligent automatic joints for the rotary support 8 comprise the matching automatic closing piece 28. Closed lock sheath 29 is located at the end of the rotary support 8 joints and automatic closing piece 28 on the upper side of the rotary support 8.

The ball-end horizontal rotating shaft 15 drives the cutter assembly by the inward motor. The cutter assembly comprises interconnecting scrapers 17, inner cutters 18; and, outer cutters 19 has a soil feed opening that is connected to the solid spray device 20. The Plant growth technology index chips 26 are fixed to the rotary support 8 and are able to be stretched to roots of the trees. There are three horizontal hydraulic telescopic joints 7 evenly spaced on the outer ring of the rotary support 8.

To better understand the above-mentioned technical solution for the present invention, the following is a detailed description of the above solution for the invention with the use of specific applications.

First, the power unit for moving the transplanter 27 to hang the intelligent tree mover is positioned parallel to the bottom of the tree trunk 1. Multi-valve assembly 5 is initiated to start the horizontal hydraulic closed telescopic boom 7 to push the automatically closed rotary support 8 and move the present device forward in parallel. Locate the shaft center of the device and trees with the infrared horizontal automatic calibration point 3; Close the lateral hydraulic telescopic boom 7, lock the rotary support 8, and close the opening. Use the hydraulic power lock to lock the rotary support 8 to ensure that the rotary support 8 rotates, while locking the tree trunk 1 with ball pool data detector. Initiate the infrared horizontal automatic calibration point 6 to calibrate the vertical angle between the tree trunk and the ground.

According to the lighting direction for plant growth, use hydraulic support rod 30 to embed the plant growth oriented technical index chip 26 at the bottom of the tree trunk, and lock the tree oriented anchor point 4. The ball pool data detector 2 estimates the soil balls' diameters and depths. And extends outward lateral hydraulic telescopic boom 9 according to the data and rotary support 8 rotates in the clockwise direction, and the lateral hydraulic telescopic boom 9 downward 5 cm. Clean the surface soil. Move the vertical hydraulic telescopic joint 12 downward, and start the scraper 17, inner cutter 18, outer cutter 19 and solid spray device 20. The soil is discharged outside the ball pool as a result of the pounding power of ramming bent plate 13. The Vertical hydraulic angle rotating shaft 11 is rotates according to the soil balls' shape and the degree of the soil compaction regulating to reduce the speed of scraper 17, inner cutter 18 and outer cutter 19. When the scraper 17, inner cutter 18 and outer cutter 19 are at the bottom of the soil ball, the ball-end horizontal rotating shaft 15 drives the hydraulic foldable retractable cutter 16 in parallel, extending to the center of the bottom of the soil ball. The bottom of the root ball and soil is then cut off, and the horizontal hydraulic telescopic boom 7, the lateral hydraulic telescopic boom 9 and vertical hydraulic telescopic joints 12 are tightened. The ball pool data detector 2 and hydraulic foldable telescopic cutter 16 are used to plant trees; and, the overall soil ball is perpendicular to the ground, and the trees and soil balls will be loaded for purposes, such as planting.

The trees and the soil ball will be lifted to the loading car, and, while the intelligent device will rotates slowly, the trees will be dumped in the car. When planting, the trees and soil balls will be vertically put into the soil pool. The hydraulic foldable telescopic cutter 16 back, the locking force between pool data detector 2 and the tree trunk is loosened so that the whole tree will sag to the bottom of the pool. Consequently, the soil balls and ground will be compacted densely. And the rotary support will rotate in a low-speed to the complete backfill of the soil. The hydraulic tamping device 14 vibrates and compacts the soil, while the vertical hydraulic telescopic joint 12 moves upward. The planting process will be completed subject to compaction density. After that, then open pool data detector 2, horizontal hydraulic closed telescopic boom 7 and rotary support 8 recovers the device.

While digging up the tree pool, the central position is located by the infrared central contact 3. The data is determined by the lateral hydraulic telescopic boom 9, which rapidly rotates the rotary support 8 in a clockwise direction. When the scraper 17, inner cutter 18 and outer cutter 19 are at the tree pool depth, the hydraulic foldable telescopic cutter 16 moves parallel to the inside and cuts off the bottom end of the tree soil, while lifting the transplanter to discharge soil.

In summary, the present invention integrates the following components and functions: tree pool digging, tree moving, soil protection and tree planting, as well as the accurate use of balls, ball diameters, ball shapes and dimensions. Further, fixing the surface hardening for balls avoids the tedious process of repackaging and solves key problems associated with the traditional art, such as low efficiency, poor quality, and low survival rates.

Obviously, many modifications and variations of the present invention are possible in light of the above teachings. It is therefore to be understood that, within the scope of the appended claims, the invention may be practiced otherwise than as specifically described.

The invention claimed is:

1. An intelligent tree transplanter, comprising:
   rotary support,
   a structure comprising at least one horizontal hydraulic closed telescopic boom driven by and connected to a driving device;
   a multi-way valve assembly, tree-oriented anchor point and infrared horizontal automatic calibration point;
   a ball pool data detector comprising at least one infrared central contact located in a center of the driving device;
   a lateral hydraulic telescopic boom that drives the rotary support located at the bottom of the driving device, comprising a number of regolith scrapers and at least one vertical hydraulic angle rotating shaft connected to vertical hydraulic telescopic joints located at a bottom of the driving device;
   vertical hydraulic telescopic joints connected to a ball-end horizontal rotating shaft located at the bottom of the driving device;
   a ball-end horizontal rotating shaft connected to an hydraulic foldable telescopic cutter located horizontally at the bottom to the center of the driving device;
   a hydraulic foldable telescopic cutter connected to a solid spray device at another end of the driving device;
   vertical hydraulic telescopic joints comprising a ramming bent plate, a hydraulic tamping device, and a ball-end horizontal rotating shaft comprising a cutter assembly, wherein said rotary support is connected to plant growth technology index chips on the inner ring by an hydraulic support rod.

2. The intelligent tree transplanter apparatus of claim 1, wherein the driving device comprises an operating rack connected to the horizontal hydraulic closed telescopic boom by the drive; wherein an operating rack is connected to the telescopic boom by a loaded rotation shaft; wherein the telescopic boom is connected to the operating rack by an adjustable boom and connected to and driven by a power unit for walking of the intelligent tree transplanter; and wherein the adjustable boom further comprises hydraulic support arms.

3. The intelligent tree transplanter apparatus of claim 1, wherein the rotary support comprises two semicircular rings that are able to piece a whole circular ring with intelligent automatic joints for the rotary support.

4. The intelligent tree transplanter apparatus of claim 3, wherein the intelligent automatic joints for the rotary support comprises a matching automatic closing piece and a closed lock sheath.

5. The intelligent tree transplanter apparatus of claim 1, wherein the ball-end horizontal rotating shaft drives the cutter assembly by the inward motor.

6. The intelligent tree transplanter apparatus of claim 1, wherein the cutter assembly comprises interconnecting scrapers, inner cutters and outer cutters, and a soil feed opening that is connected to the solid spray device.

7. The intelligent tree transplanter apparatus of claim 1, wherein the plant growth technology index chips are fixed to the rotary support and are able to be stretched to roots of the trees.

8. The intelligent tree transplanter of claim 1, wherein three horizontal hydraulic telescopic joints are evenly located on the outer ring of the rotary support.

* * * * *